United States Patent [19]

Nakagawa

[11] Patent Number: 4,666,205
[45] Date of Patent: May 19, 1987

[54] AUXILIARY VISOR FOR A MOTOR VEHICLE

[76] Inventor: Francis Y. Nakagawa, 17328 Glenmore, Redford, Mich. 48240

[21] Appl. No.: 754,942

[22] Filed: Jul. 15, 1985

[51] Int. Cl.⁴ .............................................. B60J 3/02
[52] U.S. Cl. ................................ 296/97 K; 296/97 C
[58] Field of Search .............. 296/97 K, 97 C, 97 R, 296/97 H, 97 B, 97 G, 97 F, 97 J; 160/DIG. 3; 248/289.1

[56] References Cited

U.S. PATENT DOCUMENTS

| | | | |
|---|---|---|---|
| 898,486 | 9/1908 | Lanier | 248/289.1 |
| 2,823,950 | 2/1958 | Harris | 296/97 |
| 2,912,275 | 11/1959 | O'Neal | 296/97 |
| 2,917,186 | 12/1959 | Beets | 296/97 K |
| 2,965,415 | 12/1960 | Dryden | 296/97 |
| 3,184,265 | 5/1965 | Calabrese | 296/97 |
| 3,191,986 | 6/1965 | Simon | 296/97 |
| 3,339,970 | 9/1967 | Jensen | 296/97 |
| 3,556,585 | 1/1971 | Binder | 296/97 |
| 4,053,180 | 10/1977 | White | 296/97 K |
| 4,500,131 | 2/1985 | Fleming | 296/97 K |

FOREIGN PATENT DOCUMENTS

| | | | |
|---|---|---|---|
| 577519 | 6/1958 | Italy | 296/97 K |
| 130786 | 2/1951 | Sweden | 296/97 K |

Primary Examiner—Robert B. Reeves
Assistant Examiner—Carol L. Olson
Attorney, Agent, or Firm—Gifford, Groh, VanOphem, Sheridan, Sprinkle and Dolgorukov

[57] ABSTRACT

An auxiliary sun visor which is readily mountable to the existing sun visor of a motor vehicle. The auxiliary visor generally comprises an elongated shaft which is secured to a mounting plate which has a configuration substantially identical to the configuration of the mounting bracket of the existing visor. The mounting plate of the auxiliary visor is adapted such that it may be mounted between mounting bracket of the existing visor and the ceiling of the interior vehicle compartment using the existing hardware. The visor panel is rotatably mounted to the elongated rod such that it may be rotated into the necessary position. An alternative embodiment of the invention utilizes dual shafts permanently attached to the mounting bracket of the visor. The invention eliminates the risk of accident caused by the vehicle driver repeatedly rotating the sun visor into position to shield their eyes and for conventional use on the front passenger side.

6 Claims, 5 Drawing Figures

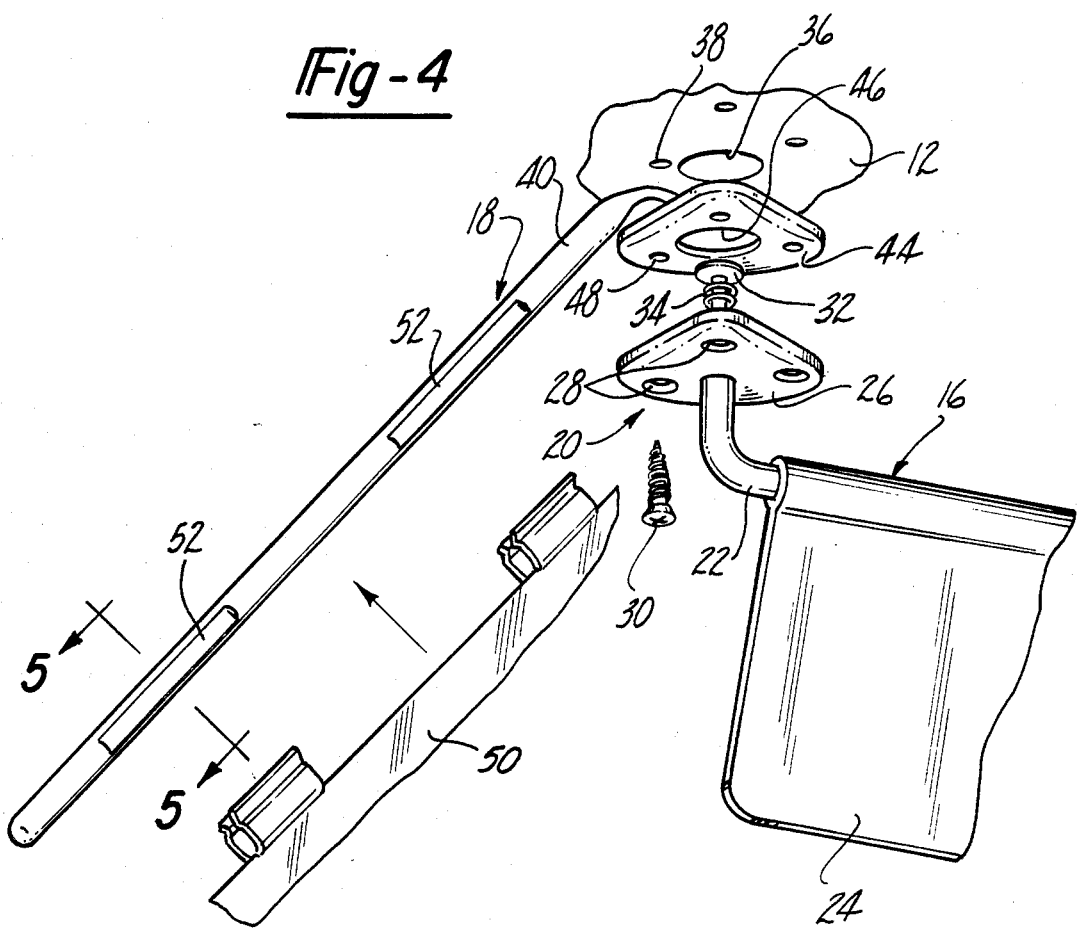
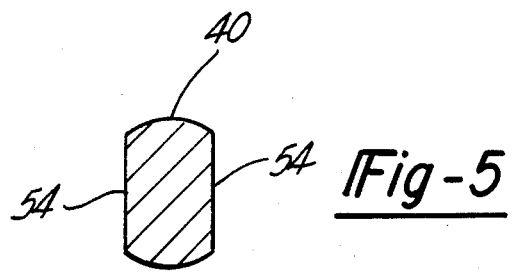

AUXILIARY VISOR FOR A MOTOR VEHICLE

BACKGROUND OF THE INVENTION

I. Field of the Invention

This invention relates to a sun visor for a motor vehicle and, in particular, to an auxiliary visor which may be readily mounted to the existing sun visor of the motor vehicle.

II. Description of the Prior Art

Adjustable sun visors have been standard equipment on motor vehicles for many years. Generally, these visors are mounted to the upper interior surface of the vehicle so that the visor may be readily moved into a non-obstructing position when not needed. Modern visors include a mounting bracket, which secures the visor to the upper inside corner of the driver/passenger's compartment, a shaft extending from the mounting bracket, and a visor panel which provides the necessary shielding. The visor panel has a length which is longer than the length of the shaft and a width which is sufficient to effectively shield the eyes of a driver/passenger from the sun or other source of glare while not obstructing the driver's view of vehicle traffic. In addition, the visor can usually be positioned at different angles by pivoting the visor panel about the visor shaft.

Although this arrangement effectively shields glare or sunlight which may be emanating from a source in front of the vehicle, it is often advantageous to shield glare which may be coming through the side window of the vehicle. To overcome this, the visor was constructed so that it may be pivoted about the mounting bracket. However, because of the length of the visor shaft and panel, pivoting the visor from its front position to its side position usually requires the driver to "duck" and move his head to the side thereby taking his eyes off the road. In heavy traffic, this may prove costly or threatening.

To overcome this disadvantage of the prior art visors various specially designed visors were developed which allowed the user to position the visor panel such that the visors would shield the driver/passenger from glare or sunlight at any angle without moving the visor. Generally, these devices involved multiple or dual visors, all similar to the individual visor of the prior art, and depending from a mutual mounting bracket. Since this bracket must be specially designed, the cost of installing the auxiliary visor may prevent a user from deeming if worthwhile or cost-effective. Moreover, because modern vehicles are factory equipped with individual visors, this primary visor would have to be discarded in order to install the multiple visor arrangement.

Prior known auxiliary visors have been developed which attach directly to either the shaft or visor panel of the primary or existing visor. Generally, a clip or similar mounting device is utilized to demountably attach the auxiliary visor. However, because the primary visor is mounted to the interior of the car at a single pivot point, the added weight of the auxiliary visor can eventually cause the visor shaft to bend or break away from the mounting bracket and the interior surface of the vehicle. Moreover, these auxiliary visors are dependent upon the position of the primary visor and, thus, must be pivoted into different positions depending upon the position of the primary visor in order to provide effective shielding.

SUMMARY OF THE PRESENT INVENTION

The present invention overcomes the disadvantages of the prior known multiple or auxiliary visors by providing an auxiliary visor which is readily secured to the existing mounting structure of the primary visor and which remains in position along the side window thereby allowing simple positioning as necessary.

The auxiliary visor according to the present invention generally comprises a visor shaft and a visor panel which pivotally rotates about the visor shaft. The auxiliary visor may be readily secured to the structure of the primary visor which includes a flip-down visor panel mounted to a visor shaft which is secured to a mounting bracket. This mounting bracket of the primary visor includes mounting screws which detachably secure the primary visor to the upper interior surface of the vehicle.

Attached to one end of the auxiliary visor shaft is a mounting plate which facilitates attachment of the auxiliary visor to the primary visor structure. The plate is preferably the same shape as the mounting bracket of the primary visor so that once in position the mounting plate is hidden from view. In addition, the mounting plate is provided with a plurality of apertures, including a central opening, which allows the end of the shaft from the primary visor to extend through the mounting plate, and several smaller openings which correspond to mounting screw openings of the mounting bracket thereby accepting the mounting screws.

Alternatively, the auxiliary visor may be secured directly to the primary visor by attaching the end of the auxiliary visor shaft to the primary shaft. Preferably, the two shafts are disposed at right or obtuse angles such that the auxiliary visor remains in the proper position.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 4 is a perspective view of a further embodiment of the present invention; and FIG. 5 is a cross-sectional perspective taken along lines 5—5 of FIG. 4.

DETAILED DESCRIPTION OF A PREFERRED EMBODIMENT OF THE PRESENT INVENTION

Figure 1:
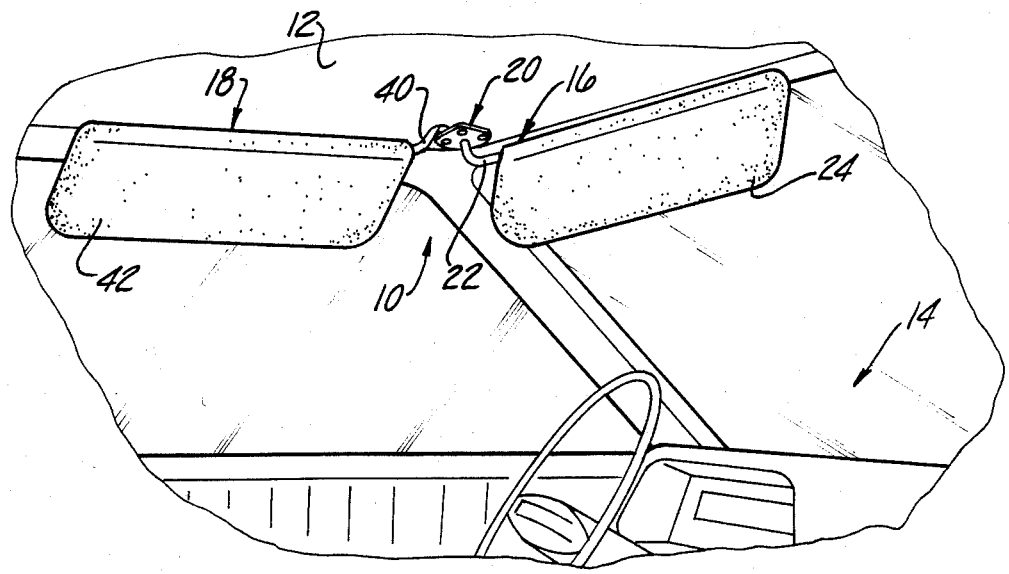
FIG. 1 is a perspective view of the interior compartment of a motor vehicle with the AUXILIARY VISOR of the present invention mounted to the interior surface of the vehicle compartment.
Figure 2:
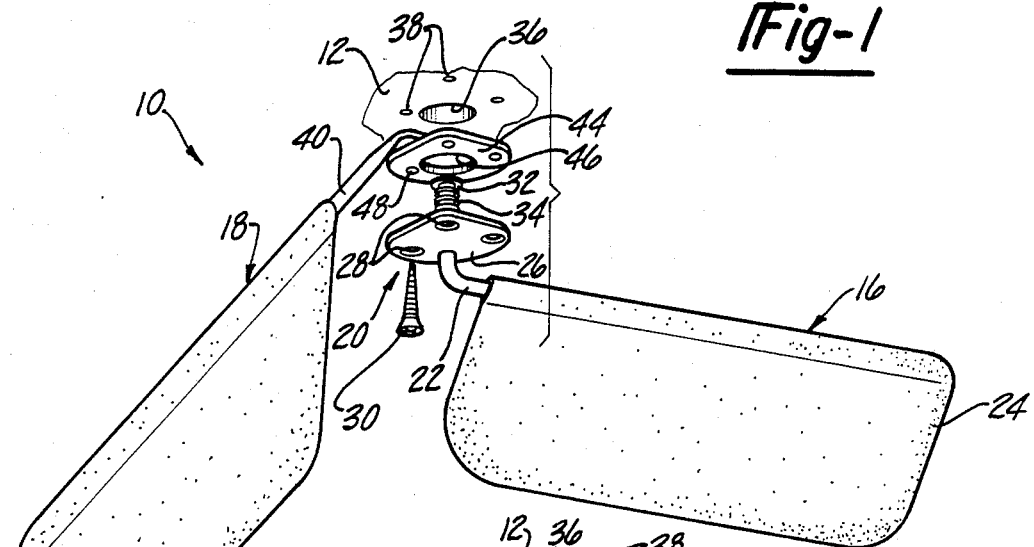
FIG. 2 is a perspective view of the preferred embodiment of the present invention shown disassembled from the primary visor.

Referring generally to FIGS. 1 and 2, a dual visor assembly 10 embodying the present invention is threreshown. The assembly 10 is generally mounted to the upper interior surface 12 of a motor vehicle 14 and generally comprises a conventional visor assembly 16, which is standard equipment on the majority of modern motor vehicles, and an auxiliary visor 18 which may be either removably mounted or integrally formed with the conventional visor assembly 16, as will be hereinafter more fully described.

Referring now to FIG. 2, the conventional or primary visor assembly 16, which is installed during assembly of the vehicle 14, generally comprises a mounting bracket 20, a visor shaft 22, and a visor panel 24. The visor panel 24 has a substantially rectangular shape in order to provide sufficient shielding of glare or sunlight across the vehicle user's field of vision yet permit safe visibility of road conditions and other vehicles directly in front of the motor vehicle 14. The visor panel 24 is rotatably connected to the visor shaft 22 such that the visor shaft 22 extends along one edge of the visor panel 24 substantially the entire length of the panel 24. Moreover, the panel 24 is mounted to the shaft 22 such that the panel 24 can be pivoted about the shaft 22 in either direction.

Referring still to FIG. 2, the visor shaft 22 is connected to the mounting bracket 20 and has one end which extends through the bracket housing 26 of the bracket 20. The mounting bracket 20 also includes a plurality of mounting screws 30 which extend through a corresponding number of peripherally spaced apertures 28 in the bracket housing 26. The end of the visor shaft 22 is secured to the bracket housing 26 by a washer 32 secured to the end of the shaft 22 which retains a compression spring 34 between the washer and the bracket housing 26. The force created by the spring 34 between the washer 32 and the bracket housing 26 creates a frictional resistance sufficient to cause the primary visor 16 to remain in any rotative position to which it may be moved by adjustment of the visor shaft 22.

The primary visor 16 is preferably mounted to the upper interior surface 12 of the vehicle 14 by securing the mounting bracket 20 to the surface 12. The surface 12 preferably includes a centrally disposed opening 36 and a plurality of peripherally disposed openings 38. The central opening 36 accepts the end of the visor shaft 22 and the compression spring 34 so that the bracket housing 26 abuts against the surface 12. Thereafter, the apertures 28 in the bracket housing 26 are aligned with the openings 38 and the mounting screws 30 are placed therethrough and tightened to securely mount the bracket 20 and the visor 16 to the interior surface 12 of the vehicle. In this position, the primary visor 16 is free to pivot about the bracket 20 to any position necessary to shield glare or sunlight. However, because of the positioning of the primary visor 16, pivotting the visor 16 from the front position, shown in FIG. 1, to the side of the driver, requires the driver to "duck" his head out of the way of the visor. If done while the vehicle is in motion, the chance of a collision or similar accident is increased.

In the preferred embodiment shown in FIGS. 1 and 2, the auxiliary visor 18 is demountably attached to the primary visor assembly 16. The auxiliary visor 18 comprises an elongated visor shaft 40 and a visor panel 42. As with the conventional primary visor 16, the visor shaft 40 of the auxiliary visor 18 extends substantially the entire length of the visor panel 42, which has a configuration which is similar to the configuration of the primary visor panel 24. Preferably, the visor panels 24 and 42 have identical configurations and coloring to provide a uniform appearance with the vehicle interior. In addition, the visor shaft 40 is secured to one edge of the visor panel 42 so that the panel 42 can pivotally rotate about the shaft 40.

Secured to the end of the shaft 40 is a mounting plate 44. The mounting plate 44 has a configuration identical to the configuration of the bracket housing 26 such that when the auxiliary visor 18 is mounted, the bracket housing 26 covers or conceals the mounting plate 44. Moreover, the mounting plate 44 is provided with a plurality of apertures, including a centrally disposed aperture 46 which corresponds to the central opening 36 in the surface 12, and smaller, peripherally disposed apertures 48 which correspond to the mounting screw apertures 28 and 38 of the bracket housing 26 and the surface 12, respectively. The central aperture 46 of the mounting plate 44 accepts the end of the visor shaft 22 and the compression spring 34. Similarly, the apertures 48 accept the mounting screws 30 therethrough thereby securing the auxiliary visor 18 to the surface 12. Thus, the auxiliary visor 18 is mounted by placing the end of the visor shaft 22 and the spring 34 through the aperture 46 of the mounting plate, aligning the mounting apertures 28 and 48 and thereafter securing both visors to the surface 12 with the mounting screws 30. Since the shaft 18 is connected to one edge of the mounting plate 44, the mounting plate 44 will be disposed between the surface 12 and the bracket housing 26. Moreover, because of their similar configuration, the bracket housing 26 will conceal the mounting plate 44 of the auxiliary visor 18.

Figure 3:
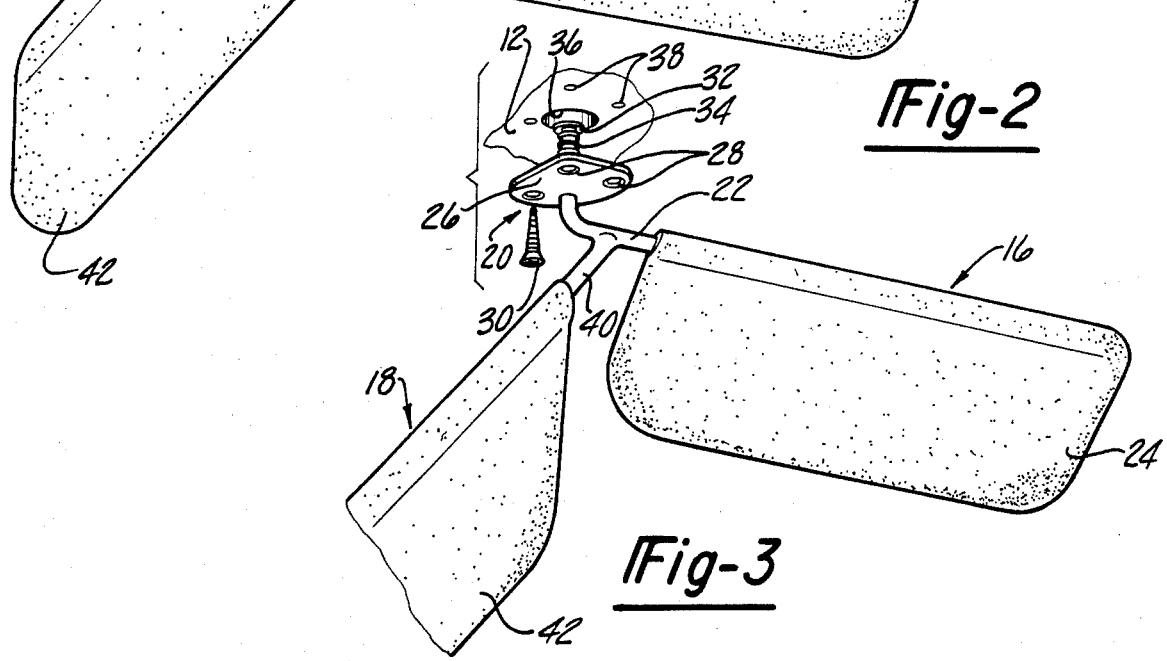
FIG. 3 is a perspective view of an alternate embodiment of the present invention.

In an alternative embodiment shown in FIG. 3, the auxiliary visor 18 is permanently secured to the primary visor 16 by integrally forming the ends of the respective visor shafts, 40 and 22. Shaft 44 is preferably formed at a right or obtuse angle to visor shaft 22 so that the visors 16 and 18 are disposed at the proper angle as will be hereinafter described.

In a still further embodiment shown in FIG. 4, the visor shaft 40 of the auxiliary visor 18 is secured to the mounting plate 44 as herein described. However, instead of a visor panel which is permanently secured to the visor shaft 40, the alternative embodiment discloses a removable or clip-on panel 50. In this embodiment, the visor shaft 40 includes removed portions 52 which define parallel surfaces 54 to which the panel 50 may be attached. Thus, the visor panel 50 may be removed or attached to the shaft 40 by the user as desired.

Thus, the present invention provides an auxiliary visor which may be used in conjunction with the primary visor found as standard equipment on motor vehicles. In each embodiment the auxiliary visor is disposed at an obtuse or right angle to the primary visor such that the auxiliary visor 18 shields sunlight or glare emanating from one side of the vehicle while the primary visor 16 shields sunlight or glare emanating from in front of the vehicle. By utilizing the dual visors 10, it is unnecessary for the vehicle occupant to shift the primary visor back and forth in response to directional changes thereby reducing the chance of collision. Moreover, when the blinding light terminates both visors may be simply pivoted out of the way by "flipping" the visor panel upwardly so that the panel abuts against the upper interior surface of the vehicle compartment. Additionally, in the embodiment shown in FIG. 4, the visor panel 50 may simply be removed or flipped up when no longer necessary.

The foregoing detailed description has been given for clearness of understanding only and no unnecessary limitations should be understood therefrom as some modifications will be apparent and obvious to those skilled in the art in light of the appended claims.

I claim:

1. For use with a motor vehicle, a visor assembly comprising
    a first visor which includes a first visor shaft, a first visor panel mounted to the first visor shaft,
    a mounting bracket for mounting one end of the first visor shaft to an upper interior surface of the motor vehicle, said mounting bracket having a planar surface adapted to flatly abut against the interior surface, a plurality of holes provided through said planar surface and fasteners with extend through said holes and through the interior surface,
    a second visor comprising:
    an elongated second visor shaft;
    means for mounting said second visor to said primary visor, said mounting means secured to a first end of said second visor shaft; and
    a substantially planar second visor panel rotatably mounted to said elongated second visor shaft;
    wherein said mounting means comprises a mounting plate secured to said first end of said second shaft, said mounting plate being sandwiched in between said mounting bracket and said interior surface, said mounting plate having openings which register with the holes in the mounting bracket and through which said fasteners extend.

2. The visor assembly as defined in claim 1 wherein said second visor panel extends substantially the entire length of said second visor shaft and wherein said second visor shaft extends along one edge of said second visor panel.

3. The visor assembly as defined in claim 2 wherein said second visor panel pivotally rotates about said elongated second shaft.

4. The visor assembly as defined in claim 1 wherein said elongated second visor shaft has a cylindrical cross-section and wherein said second shaft includes at least two elongated removed portions disposed on opposite sides of said second shaft whereby said removed portions form parallel planar surfaces.

5. The visor assembly as defined in claim 4 wherein said second visor panel comprises at least one clip to detachably mount said second visor panel to said second visor shaft wherein said visor clip engages said parallel planar surfaces of said second visor shaft.

6. For use with a motor vehicle, a visor assembly comprising
    a first visor which includes a first visor shaft, a first visor panel mounted to the first shaft, and a mounting bracket for mounting one end of the first visor shaft to an upper interior surface of the motor vehicle, a second visor comprising:
    an elongated second visor shaft;
    a substantially planar second visor panel rotatably mounted to said elongated second visor shaft;
    means for fixedly securing one end of said second visor shaft to said one end of said first visor shaft so that said shafts extend substantially perpendicular to each other,
    wherein said shafts are integrally formed with each other.

* * * * *

UNITED STATES PATENT AND TRADEMARK OFFICE
CERTIFICATE OF CORRECTION

PATENT NO. : 4,666,205

DATED : May 19, 1987

INVENTOR(S) : Francis Y. Nakagawa

It is certified that error appears in the above-identified patent and that said Letters Patent is hereby corrected as shown below:

Col. 1, line 49, delete "if" and insert --it--;

Col. 3, line 53, delete "otting" and insert --oting--;

Col. 4, line 14, before "38" insert --openings--;

Col. 4, line 25, before "shaft" insert --visor--;

Col. 4, line 25, delete "18" and insert--40--;

Col. 4, line 34, delete "Shaft 44" and insert --Visor shaft 40--.

Signed and Sealed this

Twenty-second Day of September, 1987

Attest:

DONALD J. QUIGG

Attesting Officer  Commissioner of Patents and Trademarks